Aug. 18, 1931.  H. D. JAMES  1,819,513
GARAGE ELEVATOR
Filed March 27, 1928  8 Sheets-Sheet 1

INVENTOR
Henry D. James
BY
Chesley E. Carr
ATTORNEY

Aug. 18, 1931.  H. D. JAMES  1,819,513
GARAGE ELEVATOR
Filed March 27, 1928  8 Sheets-Sheet 2

INVENTOR
Henry D. James
BY
ATTORNEY

Aug. 18, 1931.    H. D. JAMES    1,819,513
GARAGE ELEVATOR
Filed March 27, 1928    8 Sheets-Sheet 3

INVENTOR
Henry D. James
BY
Wesley E. Barr
ATTORNEY

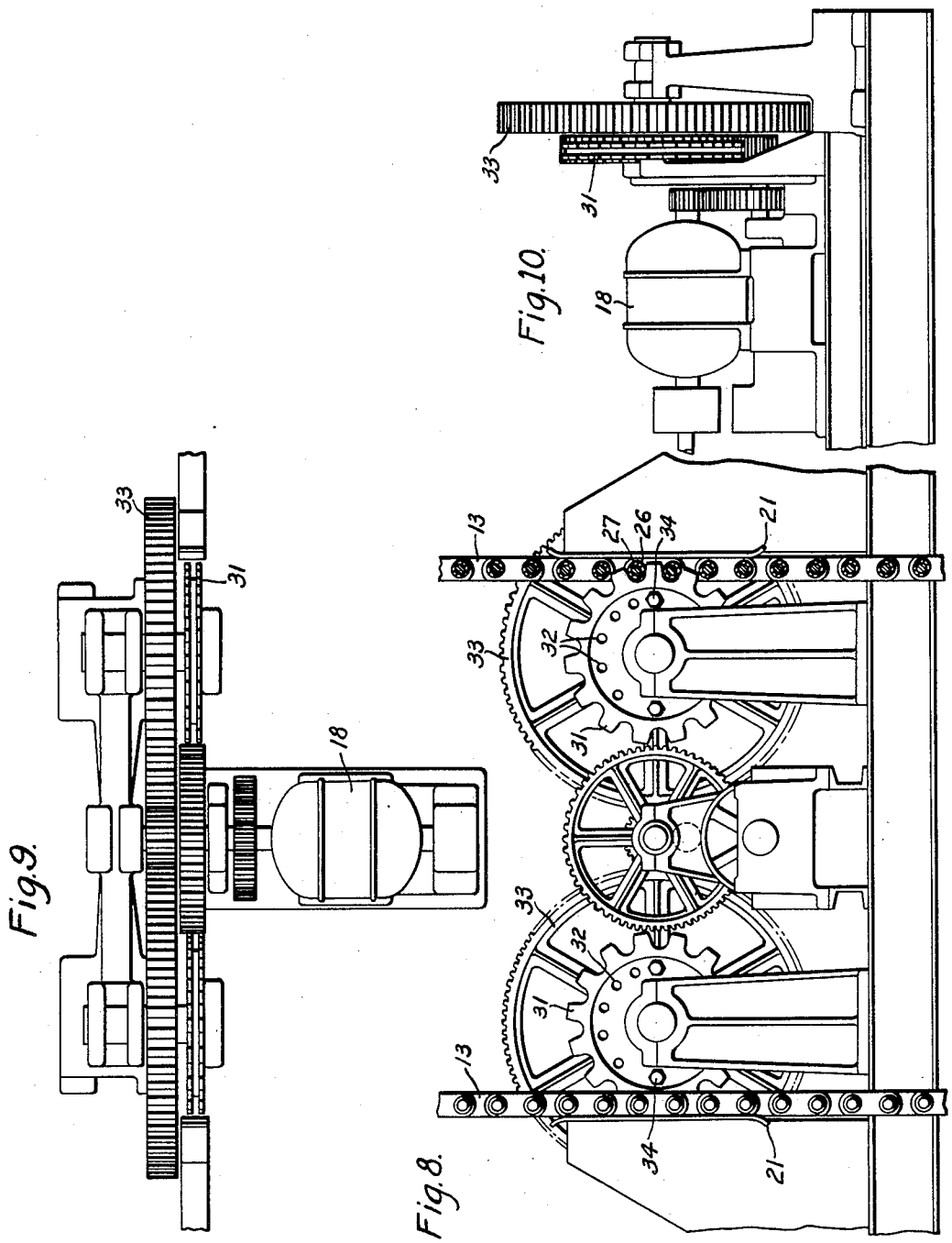

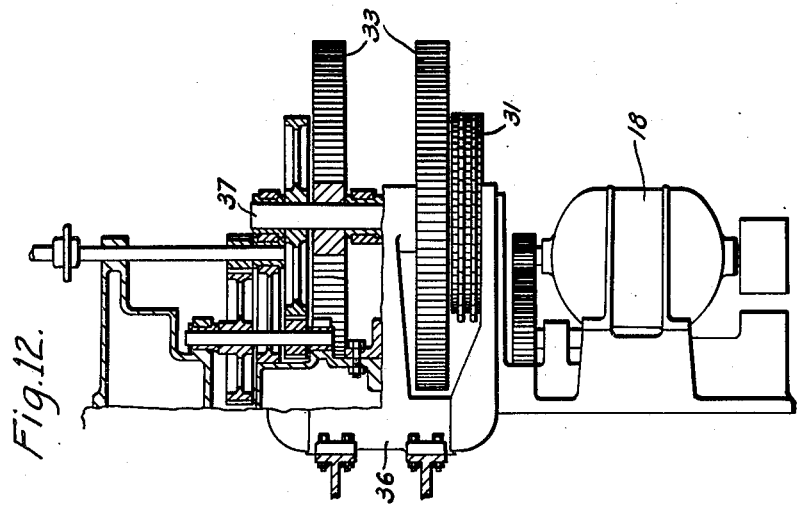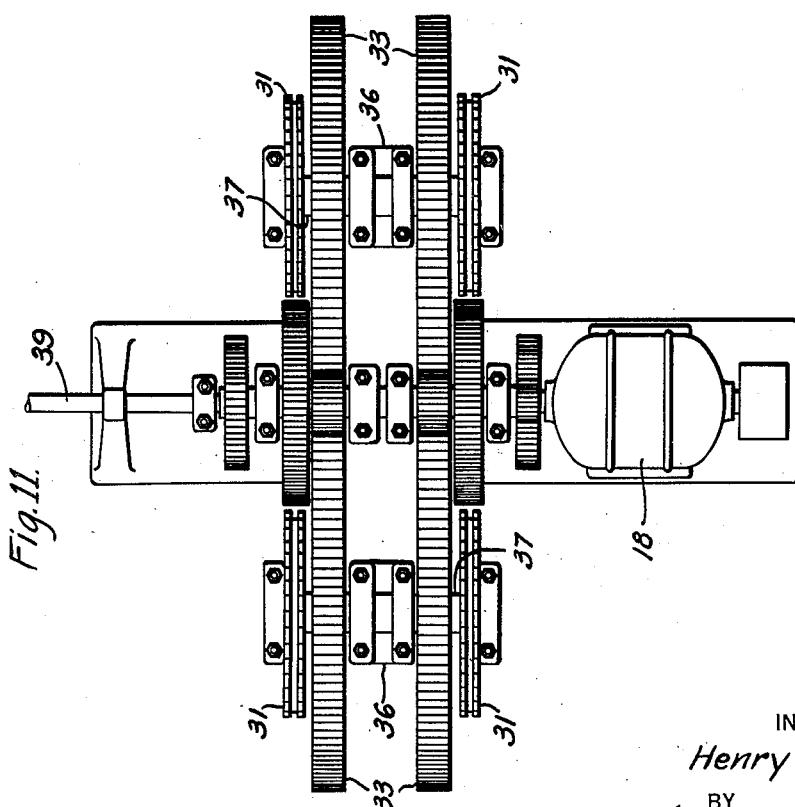

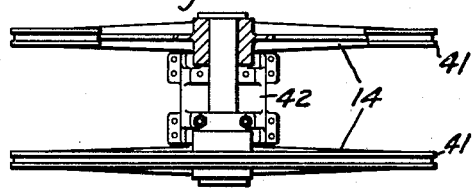
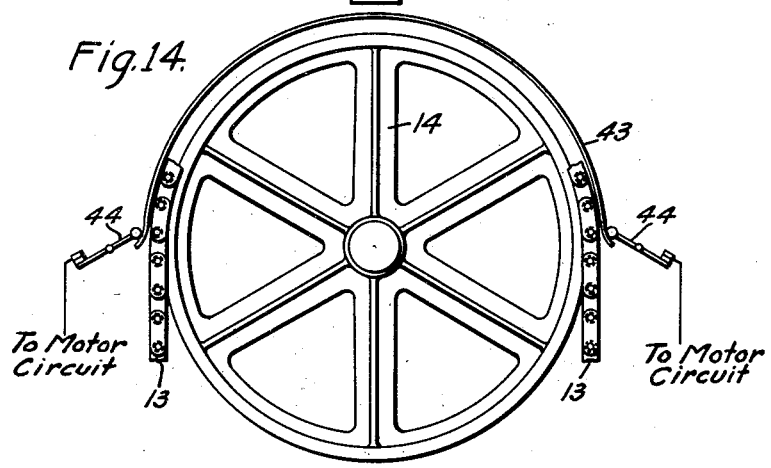
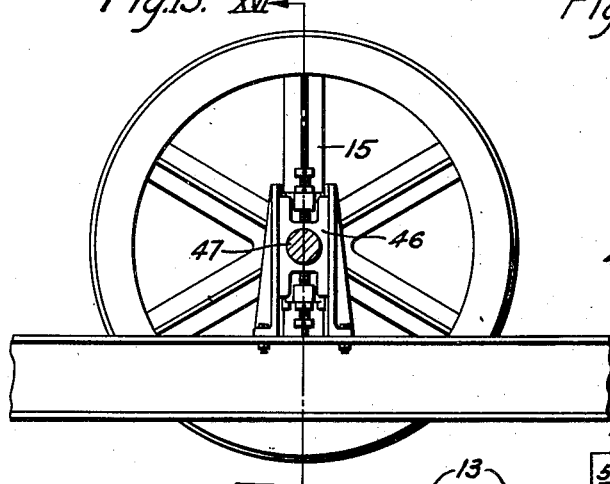
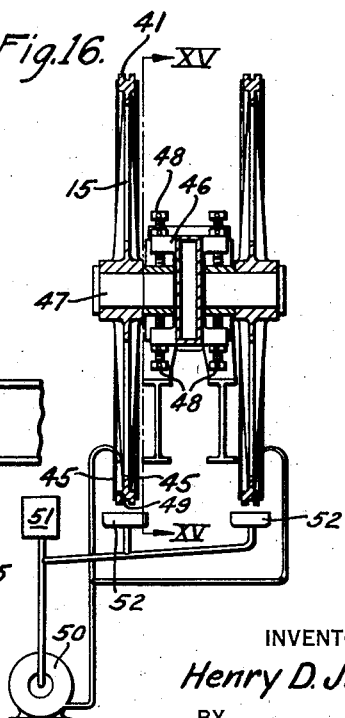
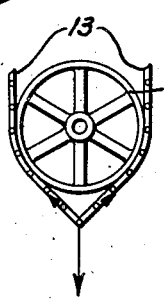

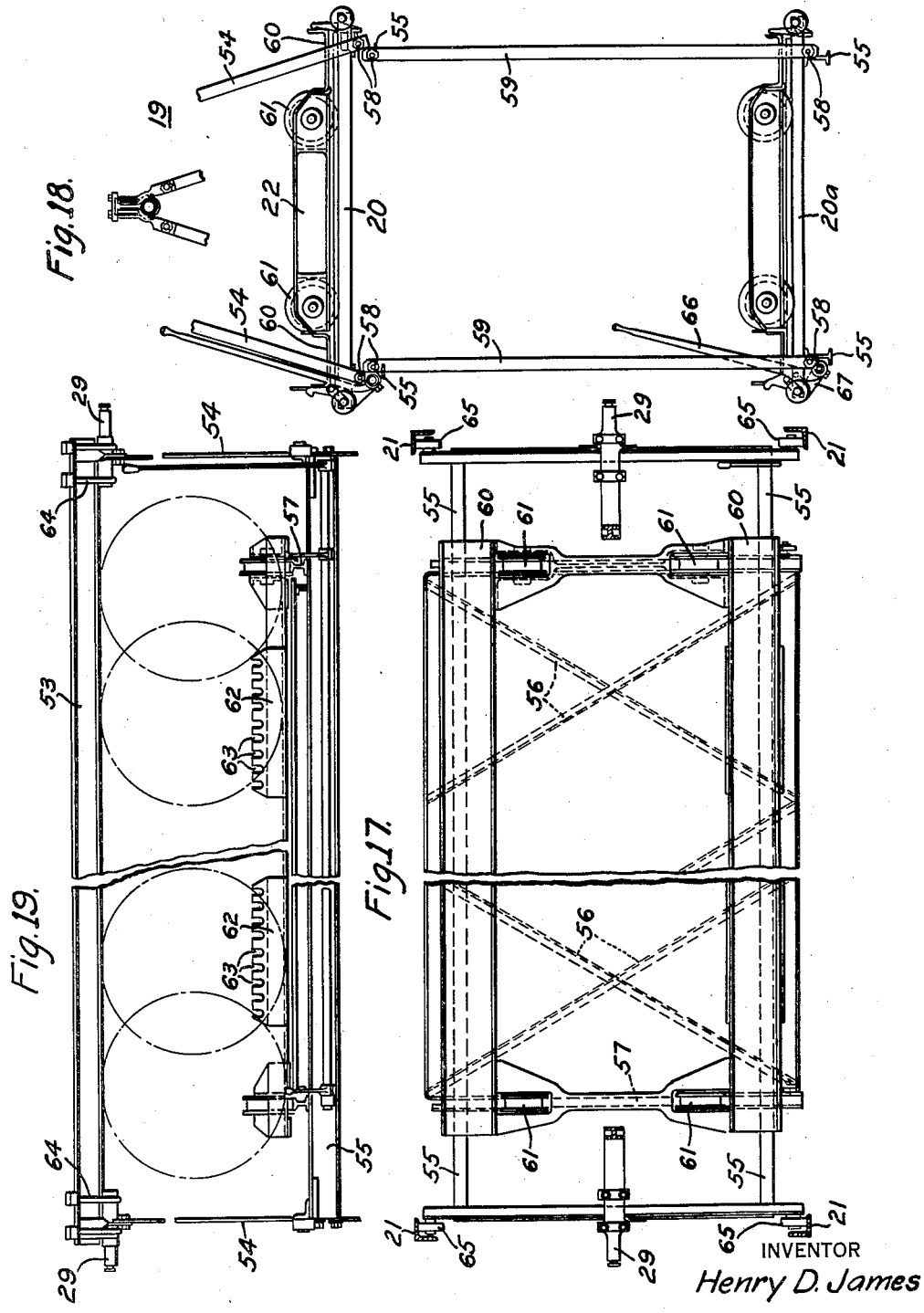

Aug. 18, 1931.  H. D. JAMES  1,819,513
GARAGE ELEVATOR
Filed March 27, 1928  8 Sheets-Sheet 8
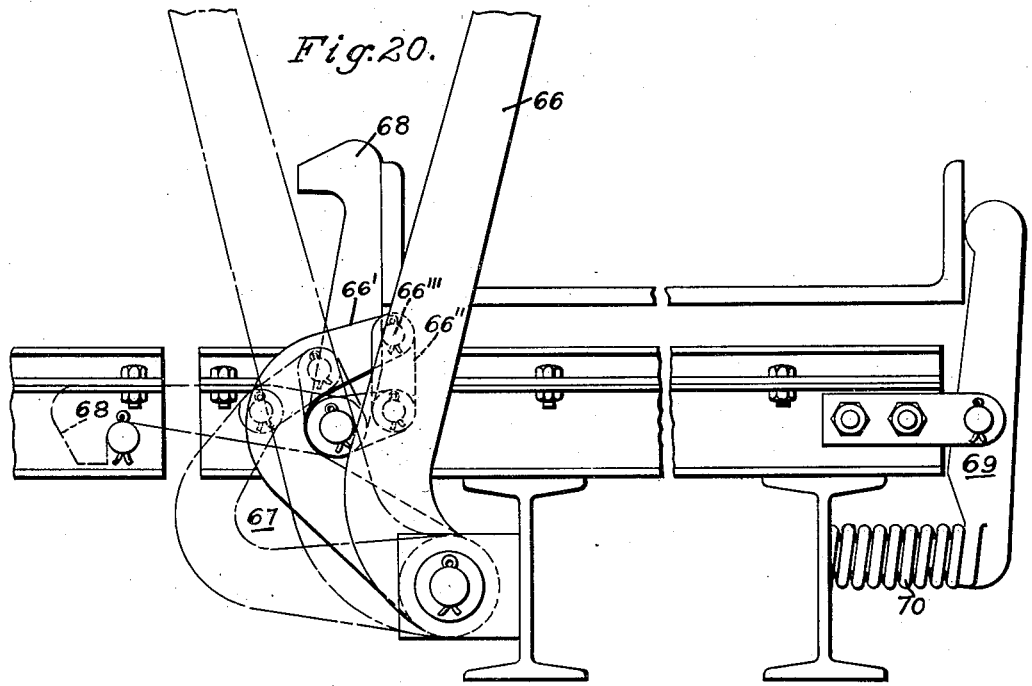
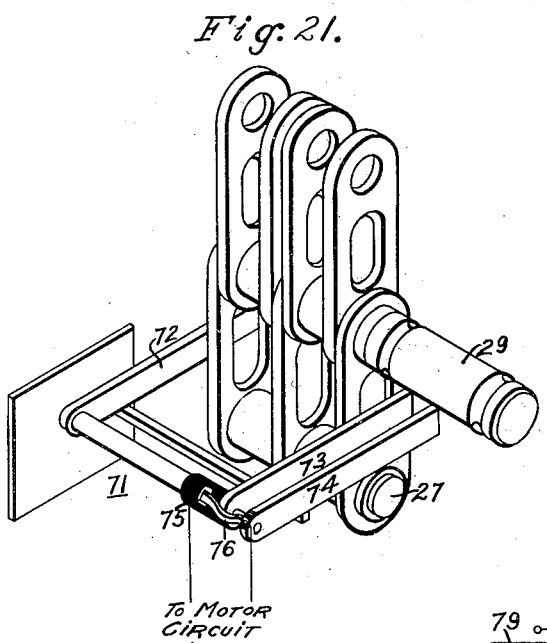
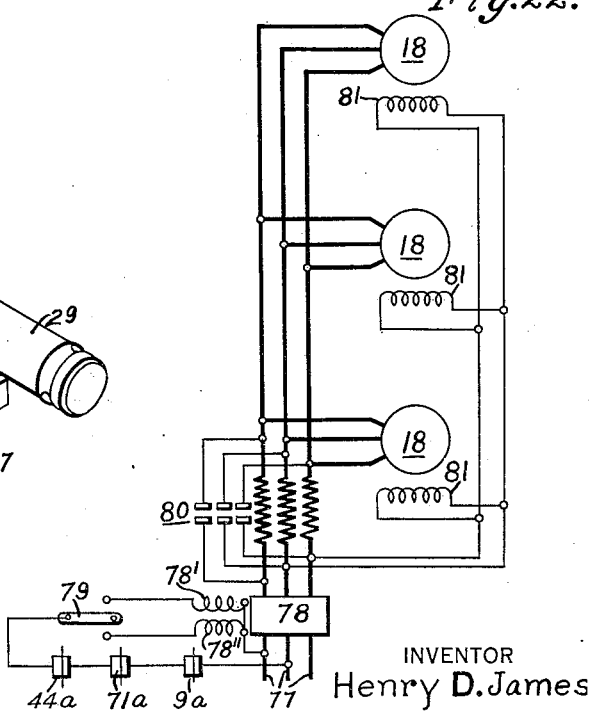
INVENTOR
Henry D. James
BY
ATTORNEY Patented Aug. 18, 1931

1,819,513

UNITED STATES PATENT OFFICE

HENRY D. JAMES, OF EDGEWOOD, PENNSYLVANIA, ASSIGNOR TO WESTINGHOUSE ELECTRIC & MANUFACTURING COMPANY, A CORPORATION OF PENNSYLVANIA

GARAGE ELEVATOR

Application filed March 27, 1928. Serial No. 265,011.

My invention relates generally to conveyor systems, particularly to systems for the parking of automobiles in business sections or large cities and more particularly to an elevator on which a number of automobiles may be parked and quickly obtained when desired.

In business sections of large cities, and particularly in sections in which there are a number of large office buildings, the provision of adequate parking space for those persons who desire to travel by automobile to and from their work is impossible. The delay encountered by the patrons of parking lots, garages and the like, when their car is called for, is undesirable, and when parking space is particularly in demand, the prices charged for such service is practically prohibitive for daily utilization. In order to facilitate the movement of traffic in such sections, street parking is ordinarily under police regulation so that a great number of people who desire to use their automobile are forced to resort to other means of transportation to and from their work.

The object of my invention, generally stated, is to provide for parking a number of automobiles and substantially small ground area and to permit each parked automobile to be readily accessible without sacrificing useful parking space.

Another object of my invention is to provide for parking automobiles in a structure wherein substantially the entire volume of the structure is available for storing automobiles.

A further object of my invention is to provide for parking automobiles one above the other, and permit any of the parked automobiles to be readily obtainable without disturbing the others.

Another object of my invention is to utilize the inside space of office buildings, which is ordinarily artificially lighted and little in demand as office space, for parking the automobiles belonging to those persons employed in the building.

A more specific object of my invention is to provide an elevator for parking automobiles which may be extended vertically substantially indefinitely without increasing the tension and stresses in the operating members.

An additional object of my invention is to provide a method of lengthening a chain conveyor system without increasing the operating tension in the chain.

Another object of my invention is to provide an arrangement of load carrying platforms on a vertically extending endless chain conveyor system wherein the distance required between platforms for horizontal translation without interference at the ends is reduced to the economical minimum.

A particular object of my invention is to provide a method of driving a conveyor system at a plurality of points intermediate of its ends and permitting the installation of additional driving units with an additional section of conveyor.

It is also an object of my invention to provide a driving chain with rollers, and whose links are so constructed that the chain is not rendered inoperative upon the failure of a single link.

Another object of my invention is to provide a method of removing any section of a conveyor chain while the remainder is held in position by the driving equipment.

A further object of my invention is to provide a conveyor system wherein a single motive means operates a plurality of drives of the same conveyor.

It is another object of my invention to provide a vertical conveyor system having a variable laxness at its lower extremity, by which the bending stresses in the conveyor members prevalent when a load is supported at this point, are reduced.

It is a further object of my invention to provide for oiling a conveyor chain uniformly and economically.

It is also an object of my invention to provide a means for automatically stopping the conveyor should a travelling member become displaced from its prescribed path.

A further object of my invention is to so arrange a parking structure with reference to a street on which it is placed as to provide facilities for handling automobiles in excess of the maximum rate at which traffic conditions on the street will permit of ingress and egress of vehicles to and from the structure.

A particular object of my invention is to provide a method of avoiding continuous torsions in the structural members of a building in which a plurality of elevators operate.

Another object of my invention is to provide a method of loading automobiles on a pendantly supported platform so that it is held substantially in equi-poise in relation to the axis of support.

My invention will be described with reference to the accompanying drawings, wherein:

Fig. 8 is a view in front elevation of a driving equipment employed to drive the chains of a conveyor constructed in accordance with my invention.

Fig. 9 is a top plan view of the driving equipment shown in Fig. 8.

Fig. 10 is a view in side elevation of the driving equipment shown in Figs. 8 and 9.

Fig. 11 is a top plan view showing the method of mounting the driving equipments for interior conveyors which are supported by common structural members in the building.

Fig. 12 is a view in side elevation of the driving equipment shown in Fig. 11.

Fig. 13 is a top plan view showing the manner in which the upper guiding sheaves of the interior conveyors constructed in accordance with my invention are mounted on common supporting members.

Fig. 14 is a view in front elevation of a sheave for guiding the operating chain of a conveyor constructed in accordance with my invention and showing also a device for breaking the electrical circuit to the main motors upon the derailment of any section of the chain from the guiding sheave.

Fig. 15 is a view in front elevation of a sheave for guiding the operating chain of a conveyor constructed in accordance with my invention at its lower extremity.

Fig. 16 is a sectional view of a pair of sheaves as shown in Fig. 15 which are mounted on a common support.

Fig. 16 also shows an oiling system for supplying oil to the chain travelling on the outer periphery of the sheave.

Fig. 16a is a diagrammatic view showing the resolution of forces in the chain when a load is supported beneath the center of the lower guiding sheave.

Fig. 17 is a top plan view of a sling, pendantly mounted on the driving chain, with a truck mounted on the sling and removable therefrom.

Fig. 18 is an end view of the sling showing the arrangement for supporting a plurality of platforms on the same sling, the movable trucks mounted on the platforms and a locking device for locking the trucks on the platform and for locking the platforms in position when the truck is removed.

Fig. 19 is a view in side elevation of a platform and a truck mounted thereon, showing the method of retaining an automobile in position on the truck.

Fig. 20 is a detail view in side elevation showing the locking mechanism shown on Fig. 18, as well as a mechanism for actuating the truck into motion upon the release of the locking mechanism.

Fig. 21 is a perspective view of a device for detecting the displacement of a chain pin and upon such detection, to break the motor circuit.

Fig. 22 is a schematic diagram showing a method of controlling the operating motors in my conveyor system and applying their brakes simultaneously.

Figure 1:
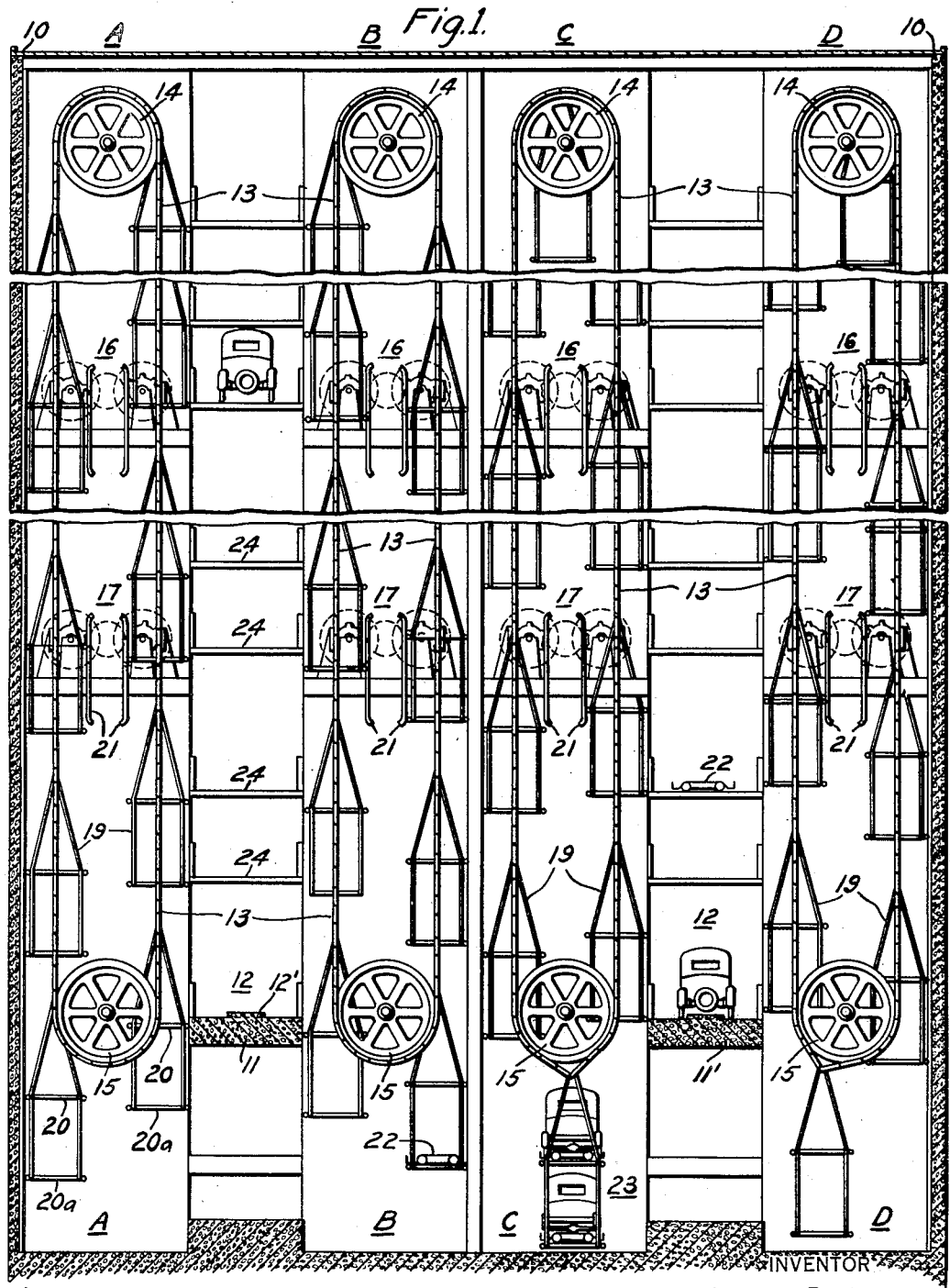
Figure 1 represents a side elevation of a building structure, in which a plurality of conveyor systems are built and are installed in accordance with my invention.
Figure 2:
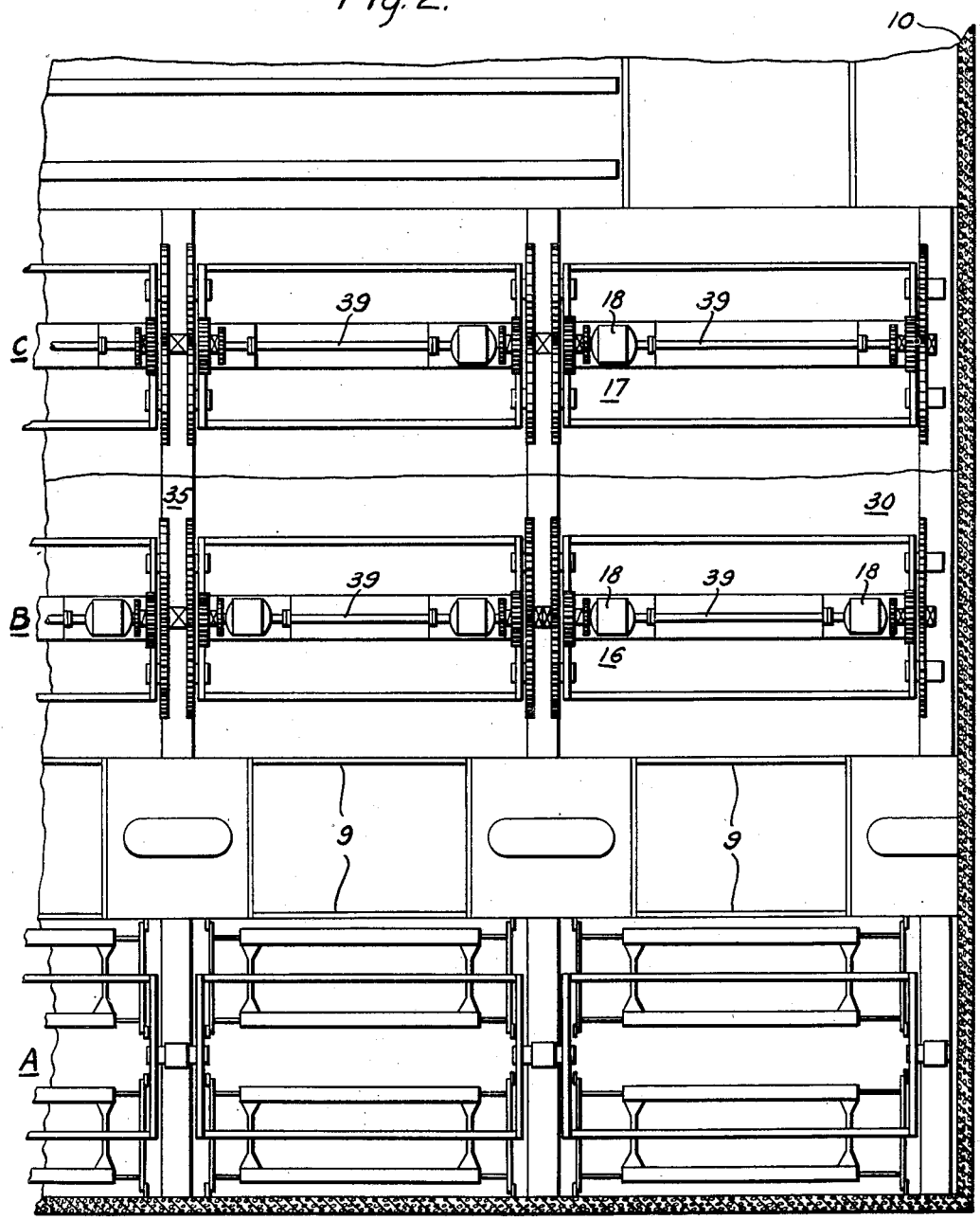
Fig. 2 is a top plan view of a portion of the building, shown in Fig. 1, and indicating a difference in the driving equipments for the system at various elevations throughout its height.
Figure 3:
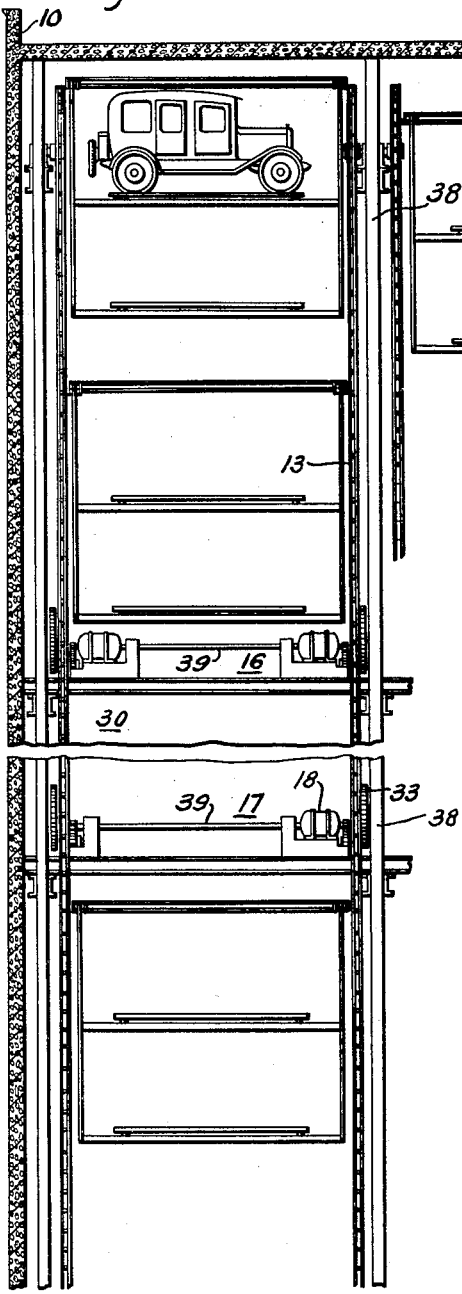
Fig. 3 is a front elevation of a section of the building shown in Figs. 1 and 2, and showing the distinction between the driving equipments at different elevations throughout the height of the building.

Referring now to Figs. 1, 2 and 3, a building 10 is shown in which a number of rows of conveyor systems A, B, C and D are installed and disposed to receive automobiles at the ground floor 11 of the building.

A passageway or driveway as 12 is provided between each pair of conveyor rows and in this way automobiles are supplied to the conveyors on either side of the driveway 12, that is to say, automobiles entering the driveway 12 may be loaded on either the conveyors in the row A, or the row B, whichever is most convenient. A guide 12' may be formed on the floor of the passage to guide automobiles in their passage through the passageway 12.

It will be observed that each of the conveyors constitutes a pair of parallel vertical columns intercommunicating at the uppermost and lowermost ends of the columns. The automobiles or other loads to be placed upon each of the conveyors is thus arranged for circuitous passage upwardly in one column and downwardly in the other column of the pair. Each of the conveyors constitutes an endless chain conveyor element 13 extending vertically in the pair of columns and carries a plurality of load supporting elements or slings 19 upon which are mounted load receptacles or platforms 20 adapted to receive automobiles or other loads placed upon the system.

The several conveyors constituting row A are all so arranged along the passageway 12 that one column of each of the conveyors is adjacent to or faces the passageway 12. In like manner, one column of each of the conveyors constituting row B is adjacent the passageway 12, while one column of each of the conveyors constituting rows C and D is adjacent opposite sides, respectively, of passageway 11'. It will also be observed that in order to make use of the greatest amount of space within the building structure 10, those columns of the conveyors in rows B and C spaced from driveways 11 and 12 are closely adjacent each other, space being left between these adjacent columns only sufficient to ensure safe passage of the load receptacles in the columns past each other.

The chains are guided in their transposition from one of the columns to the other by means of guide sheaves 14 and 15, respectively, located at the upper and lower ends of the columns. The power for driving the chain is transmitted from motors located at 16 and 17 geared directly to the chain 13 and the distances between the lower guiding sheave 15, the driving unit 17, the driving unit 16 and the upper sheave 14 are substantially equal. It will be understood, however, that additional driving units may be installed between the unit 16 and the unit 17 with an additional length of chain so that the conveyor system may be extended vertically without overloading the driving equipments.

The driving equipment 16 supports the weight suspended by that section of the chain between the driving unit 16 and the driving unit 17, as well as that unbalanced portion of load suspended between the driving unit 16 and the upper sheave 14.

The load on the driving unit 17 is that weight supported between the driving unit 17 and the lower sheave 15 so that at no time will the load on a driving unit, with the exception of the upper driving unit, exceed the maximum load which can be suspended between a driving unit and the next adjacent driving unit. However, in the case of the upper driving unit as 16, the maximum load will be, in addition to a load equivalent to that supported by the other driving units, the unbalanced load supported between the upper driving unit 16 and the sheave 14. If, however, the loads supported between the driving unit 16 and the sheave 14 are equally balanced across the chain, the driving unit 16 will support no more load than the other driving units in the system. For this reason, it is necessary to make the upper driving unit 16 of the conveyor system of double capacity to that allowed in the other driving units as 17, of the system.

A top plan view of the driving unit 16 is shown in row B of Fig. 2 and a similar view of the driving unit 17 is shown in row C of Fig. 2. It will be noted from these figures that the upper driving unit 16 comprises two motors 18, whereas the lower or intermediate driving units comprise but one motor.

Since there may be any number of driving means similar to that of 17 located between the unit 17 and the unit 16, a broken space has been left in the Fig. 1, to indicate that it is possible to install additional driving units as 17, with a corresponding section of conveyor system. Since each driving unit supports that portion of the conveyor system which lies between that driving unit and the next adjacent driving unit, additional driving units with their corresponding section of chain may be installed without increasing the operating tension in the chain or overloading any driving unit.

Since it is desirable that in the interest of economy as many automobiles as possible should be parked one above the other within the limits of the height of the building, it is desirable that each of the load supporting elements or slings 19 should be as close as possible to the next sling on its respective chain 13. However, at the upper and lower extremities of the conveyor system, the transfer of the slings from one column to the next necessitates sufficient space between adjacent slings as will allow the preceding sling to move laterally clear of the path of a following sling. With automobiles having an average width of approximately 5½ feet, I have discovered that a space of approximately 12 feet is required between the attachments of adjacent load receptacles or platforms in order to provide for this clearance, that is, there must be a clearance of not less than 4 feet between the lowermost part of one sling and the uppermost part of the next sling. However, if a plurality of platforms is provided upon a single sling, the spacing between the slings need only be increased by that amount required as a minimum for receiving the additional automobile. That is, by placing two platforms upon a single sling, having a space between the platforms of 8 feet and a space between the uppermost platform and the point of attachment of the sling to the chain 13 of approximately 8 feet, I am enabled to mount the slings with 20 feet of space between points of attachment to the chain.

In other words, I am enabled to park one automobile for every 10 feet of vertical space upon my conveyor system, whereas, using a single platform, the spacing between the slings would have to be 12 feet, and hence, I would be enabled to park one automobile, only, in every 12 feet of vertical space.

It will be observed that the attachment of the slings to the chain 13, as will hereinafter be described, provides a pendant support for the automobiles, which will permit the automobiles to be translated throughout the circuit while remaining at all times in a horizontal position. However, such pendant supporting of the automobiles and the supporting platforms' permits swinging or swaying of the platforms during the passage through the conveyor system, and hence, I find it desirable to guide these platforms as they pass the driving units or other obstructions which may be occupying the space between adjacent columns of the conveyor system. I have illustrated at 21 such guiding members as being mounted adjacent each of the driving equipments 16 and 17, and it is to be understood that one of these guiding members 21 will be provided for each driving unit or other obstruction. It will, therefore, be seen that while I have avoided the use of a continuous guiding member, I have provided for the safe passage of the platforms past all dangerous points in the conveyor system.

As a further economy in the space required to park a large number of automobiles, it is desirable that the platforms 20 should be so arranged as to receive automobiles when loaded from a sidewise direction, that is, along a path parallel to the axis of the width of the platform.

This side loading is desirable since the narrower the platform can be made in the direction of lateral movement at the upper and lower ends of the columns, the less space is required between adjacent slings on the chain. This is readily seen when it is remembered that the space of the slings is dependent upon the rapidity with which a preceding platform moves laterally out of the path of a following platform. To accomplish such side loading, I have provided on each of the platforms 20 a movable carriage or truck 22. This truck is removable from the platform to receive automobiles in the driveway 12 and translate them onto the platforms 20, such a loaded platform being shown at 23 in the row C of Fig. 1. Thus, when it is desired to park an automobile in the conveyor system, the car is driven down the driveway 12 where a vacant truck awaits it. After being driven onto the truck, the truck with its automobile is translated sidewise onto the vacant platform to which the truck corresponds. When a vacant truck is in the driveway awaiting an automobile, the corresponding platform will necessarily be leveled at the driveway and await the return of the truck. Since a device is provided, which will be described later, to prevent the operation of the conveyor system when a truck is off the platform it is impossible to move the conveyor while a truck is removed from its platform.

When the driver of an automobile desires that his car be stored for a comparatively long period of time, during which the attendant of the conveyor system believes that his platforms will be in great demand, the automobile may be loaded on a platform and translated to one of storage floors 24, where it is removed from the conveyor to the storage floors which are situated above the driveway and interposed between rows of conveyor systems so that space which might be wasted above the driveway is utilized for long-time storage.

When a patron calls for his automobile which is stored on one of the platforms, the conveyor system is operated to bring the desired platform to the driveway where the truck containing the automobile is removed to the driveway and the patron drives away, leaving the platform vacant for the storage of the automobile belonging to the next patron.

Figure 4:
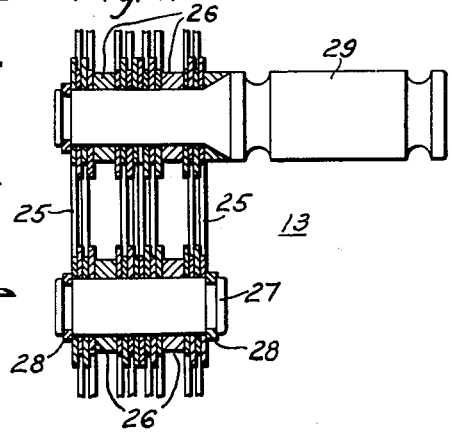
Fig. 4 is a sectional view of a chain constructed in accordance with my invention and used for driving the system described hereinafter.
Figure 5:
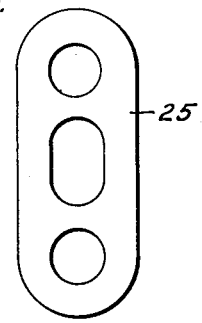
Fig. 5 is a detail plan view of a single lamination used in assembling the links of the chain shown in Fig. 4.
Figure 6:
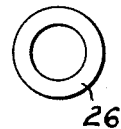
Fig. 6 is a detail end view of a roller used in the chain shown in Fig. 4.
Figure 7:
Fig. 7 is a detail end view of a locking ring used in the chain shown in Fig. 4.

Referring now to Figs. 4, 5, 6 and 7, detailed views of the chain 13 are shown. Fig. 4 shows the assembly of a plurality of laminations 25 which are divided into three groups, each group being separated from the other by a roller 26. Since a number of the laminations 25 are required to complete one link of the chain 13, if at any time one of the laminations 25 fails, the chain will not be rendered inoperative on this account, nor will any lamination be greatly overloaded due to such failure of another. A pin 27 is provided to fasten together the laminations of one link and the next adjacent link, as well as to retain the roller 26 in its position between the groups of laminations. A locking ring 28 is clamped about a groove in each end of the pin 27 and retains the laminations in their proper position on the pin 27. A number of pins having projections as 29, are provided throughout a conveyor and on these projections 29, one side of a sling is mounted. The details of such construction will be described hereinafter.

It will be observed that the links 25 of the chain 13 are divided by the rollers 26 into a plurality of groups. The driving sprockets 31, as will hereinafter be described, are suitably arranged to drive directly upon the chain 25 by engagement of teeth 31 with the rollers 26. The chain having its links made up of a plurality of groups of laminations therefore provides a plurality of points at which lifting power may be applied to the chain 13 rather than having all of the power applied at a single point. The advantage of this is at once apparent, since the lifting or driving strain is distributed throughout the length of the connecting pin 27 instead of being applied at a single point in the length of this pin to thereby cause a considerably undesirable bending stress upon the pin 27. Moreover, the use of rollers 26 provides an enlarged contact area for engagement by the teeth of the sprockets 31, thus reducing the wear upon these parts.

Referring now to Figs. 8, 9 and 10, a driving unit is shown which drives the chain 13 of a conveyor system situated at the end of the building as shown at 30 in Figs. 2 and 3. The single motor 18 is connected through a train of gears to the sprocket wheels 31 which transmit power from the motor 18 to the chain 13. Hence, when one side of the chain shown in Fig. 8 is travelling upward, the other side must be travelling downward and the train of gears is so designed that this result will be accomplished. The sprocket wheels 31 are provided with a number of holes 32 which are unequally spaced from each other, but for every hole there is a hole diametrically opposite so that the sprocket wheel 31 may be mounted rigidly on the gear member 33 through the bolts 34. Since the distance between the holes 32 in the sprocket wheels 31 is variable, an adjustment may be made so that engagement is made by each of the sprocket wheels with its corresponding chain at the proper time, with reference to the other. Should excessive laxness occur in a section of the chain, this laxness may be taken up by adjustment of the sprocket wheels on their driving gear members 33.

It will be noted from Figs. 9 and 10 that the sprocket wheels are made with two sets of teeth, with a space intervening between them so that the inner group of laminations which comprise a portion of the driving chain 13, as described above, will be nested between the teeth and allow the laminations to ride on a smooth surface, thereby removing wear from the roller members 26 in the chain. A guide, as 21, is provided to bias the chain against the sprocket wheel and assure at all times, that the sprocket wheel will be in engagement with the chain. In this way the chain and sprocket wheels act as a rack and pinion, the rack being the movable member.

It will be seen that the gear train and sprocket members for two different conveyors are mounted on a common pedestal 36 which supports a stationary shaft 37 on which the gear members 33 for adjacent conveyors are mounted and disposed for rotation. Since the pedestal 36 is supported by a single structural member which member is a part of the building structure, as shown at 38 in Fig. 3, torsions which would exist if these gear trains were mounted on separate supporting members is eliminated by balancing the load on both sides of the structural member. (See Figs. 11 and 12.)

While it is desirable to combine the supporting structure for the conveyor systems with the supporting structure for the housing 10, this is not absolutely necessary, since the supporting housing can constitute merely a shell or can be entirely omitted, if desired. In either event, however, it will be observed that the disposition of the supporting and driving members 36 and 40 for adjacent conveyors upon a single supporting structure or structural member will tend to diminish the torsional strains exerted thereon by the loads to be supported.

The driving equipment for both chains of a conveyor at a particular elevation are rigidly connected to a shaft 39 which extends from the gear train on one side to the gear train on the other side, and is operated by motor 18 and thereby assures that each side of a sling suspended between the two chains will be operated at the same velocity. The gear trains assure that the ascending speed of the chains on one side will be equal to the descending speed of the chains on the other side. Thus, it is possible with one driving motor, to operate four parallel chains at the same velocity, two of said chains being operated in one direction and the other two in the opposite direction.

As has previously been set forth, the uppermost motive means or motor driving device 16 for each of the conveyor systems is provided with sufficient power to substantially equal twice the driving power of the lower driving devices 17, and this provision permits the use of a guiding device at the top and bottom of the conveyor system, as distinguished from a driving device at these points. Since no power is to be applied at the top and bottom of the system, each of the endless chains 13 may be guided at its upper extremity by a toothless sheave 14, as shown in Fig. 14, on which a pair of rails or flanges 41, shown in Fig. 13, are provided to engage the chain rollers and prevent the chain from being displaced from its prescribed path. At interior sections of the building, as at 38 in Fig. 3, the sheaves 14 for this conveyor system, are mounted on a common pedestal 42 and supported by a common building structural member as described for the driving equipments above.

A shield 43 is provided around the upper half of the sheave 14, which will come into contact with the chain 13 should the chain ride up over the rails 41 of the sheave 40. The shield 43 is so placed that a pressure will be exerted upon it by the chain 13 when it is derailed from the sheave 40 and when such pressure is exerted upon the shield 43, an electrical circuit-interrupting device 44 is actuated to interrupt the supply of power to the motors 18 in that conveyor system. Such a circuit-interrupting device may be installed in the motor control circuits shown in Fig. 22, which shows a control scheme for the conveyor and the operation of such a circircuit interrupting device will be readily understood from the description set forth hereinafter.

A sheave 15, shown in Fig. 15, is provided for guiding the driving chains 13 at the lower extremity of the conveyor and an adjusting device 46 associated with it so that the tension in the chain may be varied as desired. To accomplish this, sheave 15 is supported on a shaft 47 vertically adjustable by means of screws 48.

Fig. 16a shows diagrammatically a load suspended beneath the center of the lower sheave 45 and it is seen from this diagram that the weight of the suspended load must be resolved into vertical components and a corresponding vertical force exerted by the chain 13. If the chain 13 is fitted snugly about the sheave 15 so that the chain beneath the center of the sheave 15 lies in practically a horizontal plane when a load is supported at that point, the forces exerted by the chain on the supported load will be for the greater part in a horizontal direction and in this way, bending stresses will be set up in the chain which will be injurious to the links. It is, therefore, desirable that sufficient slack be left in the chain at this point so that the weight of the suspended load may resolve itself into forces whose components are as nearly vertical as is economically possible. For this reason, the adjusting mechanism 46 has been provided for the lower sheaves 15. The sheaves 15 are mounted on a stationary shaft 47 and adjusting screws 48 are provided to permit vertical adjustment of the shaft 47 and in that way provide for adjustment of the sheave 15.

On both sides of the sheave 15 a metal plate 45 is attached which forms an oil trough with the rim as a base. A plurality of ducts 49 lead from the oil trough to the outer periphery of the sheave 15 so that oil provided within the trough will be consistently fed through to the outer periphery of the sheave 15 on which the chain 13 is travelling. A pumping means, as shown at 50, is provided to pump oil into the trough from a reservoir as 51, and to circulate oil which drips from the chain into the pans 52.

The structure of the slings 19 is shown in Figs. 17, 18 and 19 and it will be seen that the sling comprises a skeleton structure which is light in weight and may be readily disassembled or removed from the chain 13 without interfering with the operation of the remaining slings. Two projecting pins 29 on parallel chains 13 are shown rigidly connected to each other by a beam 53. The sling structure is then suspended from the beam 53 and is pendant about the chain pins 29 as an axis. At each end of the beam 53 a pair of supporting straps 54 extend downward to support the upper platform 20 of the sling. The platform structure comprises a pair of beams 55 suspended at either end of the sling by the supporting straps 54.

The beams 55 are connected together by a skeleton bracework 56 and a track-way 57 is laid laterally across the beams 55 on which the truck 22 is disposed for operation.

The connection between the supporting straps 54 and the I-beams 55 is shown in Fig. 18 and comprises a bolt 58, spot-welded into the corner of the I-beam 55 and connected to the supporting strap 54. A similar connection is provided for the supporting strap 59 which supports the lower platform 20a of the sling 19. Thus the structure of the sling may be completely disassembled by the removal of the nuts from the bolts 58 and the removal of the suspending members and platforms individually.

The construction just described provides a supporting sling and load receiving receptacles having a maximum strength for a minimum of weight of parts. Since the entire structure is merely a skeleton platform as distinguished from a solid platform, the truck 22 is illustrated also as a skeleton structure and comprises a pair of automobile guiding channels 60 which run lengthwise with reference to the sling 19. These channels are connected together by a member on which the wheels 61 are mounted so that the automobiles may be driven onto the truck in the driveway 12 and translated sidewise onto the platform by the truck 22.

As will be observed from an inspection of Fig. 18, the channels 60 are so located with reference to the track 57 as to just clear the uppermost level of the track.

Hence, during the entry of an automobile upon the truck 22 (at which time the truck 22 is moved into the passageway 12), the bending stress exerted at one pair of wheels of the automobile passes over the central portion of the channel 60 will be compensated for by the fact that the channel 60 will only bend slightly before coming in contact with the floor of the passageway 12. On the other hand, when the automobile is centered upon the truck 22, the points of application of greatest load will be closely adjacent the supporting rollers 61 at opposite ends of the channel 60, and hence, the bending stress placed upon the channel 60 will be comparatively small.

A pair of plates 62 are provided on each channel of the truck 22 and a number of grooves 63 are provided in the plate 62 so that when an automobile is driven onto the truck, a bar may be laid in the groove 63 in front and behind the wheels of the automobile and thereby retain it in its position on the truck. Since the weight of the automobile is supported by the channels 60 near the points where they are supported by the wheels 61, and since the track-way 57 is placed near the ends of the platform 20, the bending moments in the cross members of the platform as 55, and in the channel 60 of the truck are held substantially low, whereas if the wheels 61 of the truck were mounted nearer its center, a great bending moment will be existent in both the cross members 55 and the channels 60.

The main cross beam 53 is mounted on the projecting pins 29 of the chain 13 at each end by a pair of U-bolts 64, so that when it is desired to remove the sling from the chain, the U-bolts may be removed which allows the cross beam 53 to be removed from the chain pins 29, leaving the pins in the chain so that further operation of the conveyor system is not interfered with by the removal of one sling.

The guiding members 21, referred to above, are shown in Fig. 17 and rollers 65 are provided on each corner of the sling 19 to travel the guiding members 21 and thereby reduce friction when the sling comes in contact with the guiding members.

The lever 66 is provided to operate a locking mechanism 67, whose purpose it is, with the lever in the position shown in Fig. 18, to lock the truck on the platform and prevent its removal until the lever is thrown to another position. The locking mechanism is shown more fully in Fig. 20 and comprises a system of links which operate to move the dog 68 from one position to another. In Fig. 20, the position of the locking mechanism shown in full lines, is the position at which the truck is locked on the platform, while the position shown in broken lines is that position at which the truck is released and the dog 68 employed to fasten the platform to the driveway 12 or one of the storage floors 24, at which the platform may be situated.

As will be observed from an inspection of Fig. 20, movement of the lever 66 to the full line position moves links 66' and 66'' to the illustrated full line position. The configuration of link 66' is such that when moved to full line position, any strain placed upon the locking member 68 which will be exerted in a direct line with the axis 66''' of the link 66'', and hence this strain will be taken up by the link 66'' without tending to move the lever 66 from its locking position.

When the lever 66 is in the position at which the dog 68 locks the platform to the loading floor, it will be seen that it extends beyond the side of the platform so that the closure of a gate 9, which is provided at all loading floors, is prohibited and since it is well known that gates of this character are provided with devices which prevent the application of power to the driving motors while the gate is in its open position, it will be impossible to move the conveyor while the truck 22 is off the platform or before the locking mechanisms 67 has been thrown to the position at which the truck 22 is locked on the platform.

A device 69 is provided to actuate the truck into motion in the direction of a loading floor upon the release of the locking mechanism 67. This device 69 comprises a lever member pivoted near its center, one end of which is in contact with the rear channel of the truck 22 and the other end of which is in contact with a coil spring 70 so that when the truck is in its locked position, the coil spring 70 is depressed, and upon the release of the locking mechanism 67, the coil spring 70 reacts against the lever member 69 and actuates the truck into motion off the platform.

In a chain constructed as described above, it will be easily possible for the connecting pins 27 to become loosened and slip out of their proper position and a device is provided which automatically stops the conveyor, and gives an alarm before such a loosened pin may become entirely removed from the links which it joins together. A mechanism 71 is provided which comprises the three levers 72, 73 and 74, the levers 72 and 73 being mounted on a common shaft and the lever 74 being mounted on a shaft concentric with that of the levers 72 and 73. Thus, in case the pin 27 becomes loosened and starts to move outwardly, either the lever 72 or 73, dependent upon the direction the pin moves, will be caught by the pin and actuated to interrupt the power supply to the motor through the operation of the contact members 75 and 76.

The contact member 76 is mounted on the lever 74 and is movable with the lever 74. The contact member 75 is surrounded by insulating material and mounted on the shaft common to the members 72 and 73. When in their normal position, the contact member 75 is in engagement with the contact member 76 and an electrical circuit is completed between them but when either lever 72 or lever 73 is actuated, and the lever 74 remains stationary, the electrical connection between the contact members 75 and 76 is broken and the supply of power to the driving motors interrupted. A number of such devices may be provided with each conveyor, so that no pin can move an excessive distance before actuating one of the levers. The electrical connections may be made in series with the device 44 described above and connected into the circuits shown in Fig. 22 as described below.

Since it is impossible for the projecting pins 29 to move from their prescribed positions in the chain, they being rigidly held together by the cross beam 53, the lever 74 is provided so that the supply of power to the motor will not be interrupted by the safety device 71 when such a projecting pin 29 actuates the safety device 71. When the projecting pin 29 comes into contact with the levers of the safety device 71, both the levers 73 and 74 will be moved together and since there will be no relative motion between these two levers, there will be no relative motion between the contact members 75 and 76 and the electrical circuit between the contact members will not be interrupted.

A typical control scheme for the conveyor system is shown diagrammatically in Fig. 22 and provides for operating all the motors 18 in parallel as well as applying the brakes automatically upon interruption of the supply of power to the motors 18. The motors 18 are disposed to be connected to the supply line 77 through the main switch 78. The main switch 78 is of any type well known in the art which provides for reversing the connection to the motors 18, the switch 78 is preferably of the magnetically operated type having cooperating coils 78' and 78", one of which corresponds to each direction of rotation in the motor. The main switch 78 is operated to the desired position by actuation of the control switch 79 to complete an energizing circuit through the desired operating coil 78' or 78". A starting device 80 is provided in accordance with the accepted practice for applying a reduced voltage to the motors upon starting, the starting device 80 may be of any conventional type. The contact members 9a, 44a and 71a are inserted in the control switch and are respectively operated by the gate 9, the safety switch 44 and the safety switch 71, each of which has been described hereinbefore. When either of the contact members 9a, 44a or 71a are in their open position, the control circuit for the main switch 78 cannot be energized to operate the switch 78 and therefore motors 18 cannot be operated when the open switch is restored to its original position.

Each of the motors 18 is provided with a magnetically released braking mechanism with an operating coil 81. When the coil 81 is deenergized, the braking mechanism is held by the action of a spring such as braking mechanism commonly used in elevator installations. When the main switch 78 is operated to complete a circuit to the motor windings, a circuit is also completed which energizes the brake releasing coils 81, but upon interruption of the motor circuits, the coil 81 is deenergized and the brake applied to the spring.

Since the number of vehicles capable of being handled in a given length of time may be determined by the selection of the number of rows of conveyors, the number of conveyors in each row and the number of load receptacles on each conveyor, it will be observed that a garage may be designed in accordance with my system to fit the maximum number of vehicles which the street on which the structure is placed can furnish automobiles to the garage or receive them from the structure. That is, on a narrow street having normally heavy traffic, a smaller number of cars can be received or can be sent out of the structure than on a wide street having but little traffic. Knowing the traffic condition, a garage may be designed in accordance with my structure to so handle the cars as will prevent blocking at the entrances either by incoming or outgoing cars during rush periods. The side loading of cars on the platforms permits as many cars to be parked at one time as there are conveyors on one side of each of the driveways. This achieves an important saving in time.

Since it will be possible to modify the embodiment set forth and adapt it or parts thereof, to various applications without departing from the spirit and scope of the invention, it is desired that the description hereinbefore set forth be construed as entirely illustrative and not in a limiting sense.

I claim as my invention:—

1. In a conveyor system, a supporting structure, a plurality of parallel passageways therein, a plurality of conveyors, each of which comprises a pair of parallel vertical columns inter-communicating at the respective ends thereof, and a plurality of load conveying elements disposed for circuitous movement in said pair of columns, said conveyors being arranged in rows of adjacent conveyors on opposite sides of each of said passageways with one column of each of the conveyors arranged along one side of one passageway adjacent one column of a conveyor arranged along one side another passageway.

2. In a conveyor system, means defining a pair of parallel vertical columns intercommunicating at the respective ends thereof, load conveying elements disposed for circuitous movement in said pair of columns and motive means for said conveyor element for lifting loads in one column and for lowering loads in the other column, comprising common driving means engaging one of said elements in each of said columns intermediate the ends thereof and imparting movements thereto in opposite directions, and means for varying the engagement of said members relative to said driving means.

3. In a vertical conveyor system, a plurality of load conveying members disposed for movement over a vertically extending path, a plurality of load receptacles engageable with said conveying members for movement therewith, driving means for said conveying members disposed between said members at points intermediate the ends of said path, and means adjacent said motive means for guiding said load receptacles past said motive means.

4. In a conveyor system, vertically movable conveyor members, load receptacles therefor comprising a supporting bar provided at opposite ends with means for attaching it to the respective conveyor members and detaching it from the conveyor members without changing the positions of said conveyor members, at least one load supporting platform, and means detachably connecting the platform with said supporting member.

5. In a conveyor system, vertically movable conveyor members, load receptacles therefor comprising a supporting bar provided at opposite ends with detachable means for engagement with the respective conveyor members, at least one load supporting platform, means detachably connecting the platform with said supporting member, said platform comprising a track at each end thereof and means rigidly bracing said tracks against relative movement.

6. In an automobile parking garage, a vertically movable conveyor including a plurality of load receptacles, a movable carriage for receiving automobiles and transferring the same to said receptacle, said carriage comprising a platform and rolling supports therefor positioned substantially under the normal position of the automobile wheel when centered on said platform, and adjustable means for securing said automobile in a central position on said carriage.

7. In an automobile parking garage, a vertically movable conveyor including a plurality of load receptacles, a movable carriage for receiving automobiles and transferring the same to said receptacle, said carriage comprising a platform and rolling supports therefor positioned substantially under the normal position of the automobile wheel when centered on said platform, and adjustable means for securing said automobile in a central position on said carriage, means for additionally supporting said carriage platform during loading.

8. In an automobile parking garage, a vertically movable conveyor including a plurality of load receptacles, a loading floor, a movable carriage for receiving automobiles and transferring the same to said receptacles, said carriage comprising a platform and rolling supports therefor positioned substantially under the normal position of the automobile wheels when centered on said platform, and means for locking said receptacle to said floor.

9. In an automobile parking garage, a vertically movable conveyor including a plurality of load receptacles, a loading floor, a movable carriage for receiving automobiles and transferring the same to said receptacles, said carriage comprising a platform and rolling supports therefor positioned substantially under the normal position of the automobile wheels when centered on said platform, means for locking said receptacle to said floor and for locking said carriage on said platform.

10. In a vertical conveyor system, vertically movable conveyor members, load receptacles having a greater length than width and suspended between said conveyor member along an axis corresponding to the length of said receptacle, a loading floor, tracks on said receptacle extending parallel to the axis of the width of said platform, tracks on said loading floor aligning with said tracks on said receptacle, a movable carriage normally resting on said receptacle, movable from said receptacle to receive a load and transfer the same to said receptacle by movement in the direction of the smaller dimension, locking means movable from one position locking said carriage on said receptacle to a position locking said receptacle to said loading floor, said locking means constituting continuations of said tracks between said receptacle and said floor.

11. In an automobile parking elevator, a plurality of load receptacles, a carriage carried by each of the receptacles, said carriages being removable from the receptacles to receive an automobile for parking on the receptacles, and locking means for retaining a carriage on a receptacle, said locking means being disposed upon its release to actuate a carriage into motion off the receptacle.

12. A hatchway having an elevator disposed to operate therein, said elevator having a plurality of load receptacles, a carriage carried by each of said receptacles and disposed to be removable from the receptacle, locking means for retaining the carriage on said receptacles, gateways in the hatchway for allowing the carriages to be removed from the receptacles, means for rendering said elevator inoperative while the gateway is open, and means whereby said gateway cannot be closed until said carriage locking device has been operated to lock the carriage on the receptacle.

13. In a conveyor, a pair of endless chains disposed in spaced-apart parallel relation, means for supporting and guiding said endless chains for simultaneous movement in two adjacent straight paths, load receptacles supported by said chains and movable therewith, driving means for said chains comprising a sprocket wheel engaging one of the said chains in portions thereof moving in the straight paths, and means for varying the angular relation of the sprocket wheel with respect to the said chains.

14. In a conveyor system, a plurality of stations, a receptacle movable past said stations, a carriage disposed on said receptacle and movable off the said receptacle upon any of the stations, a locking means for retaining said carriage on said receptacle, and a biasing means operable upon the release of said locking means for actuating said carriage into motion off the receptacle.

In testimony whereof, I have hereunto subscribed my name this 20th day of March, 1928.

HENRY D. JAMES.